United States Patent Office 3,274,168
Patented Sept. 20, 1966

3,274,168
METHOD FOR PREPARING POLY(t-BUTYL CROTONATE) AND POLYCROTONIC ACID USING ORGANO-LITHIUM CONTAINING CATALYST SYSTEMS
Mary Lucy Miller, New York, and John Skogman, Yonkers, N.Y., assignors to American Cyanamid Company, Stamford, Conn., a corporation of Maine
No Drawing. Filed July 21, 1964, Ser. No. 384,247
9 Claims. (Cl. 260—89.3)

This application is a continuation-in-part of our copending application, Serial No. 242,645, filed Dec. 6, 1962, and now abandoned.

This invention relates to a novel process for the production of homopolymeric t-butyl crotonate. More particularly, this invention relates to a novel process for the production of homopolymers of t-butyl crotonate which comprises contacting t-butyl crotonate with (1) a compound of the formula LiR wherein R is an amyl or sec. butyl radical, (2) an alkyl lithium-lithium hydride admixture wherein the alkyl group contains 4 to 5 carbon atoms, or (3) the compound produced by reacting lithium with a fused ring aromatic hydrocarbon. Still more particularly, this invention relates to homopolymeric crotonic acid.

It is generally known that 1,2-disubstituted olefins do not readily homopolymerize under normal conditions of polymerization. Many authorities have observed this phenomena, see particularly, Alfrey et al., "Copolymerizations," Interscience, New York, page 49, 1952, and Mayo et al., Farad. Soc. Discussions, 2, page 285, 1947. We have surprisingly found, however, that one of these 1,2-disubstituted ethylenes, i.e. t-butyl crotonate, can be homopolymerized to high molecular weight polymers in excellent yield by employing a specific group of catalyst systems.

The failure of 1,2-disubstituted ethylenes to homopolymerize has generally been considered to be the result of steric phenomena. However, we have found that t-butyl crotonate can be homopolymerized by contacting the crotonate with at least one of a specific group of catalyst systems. Ethyl crotonate is not polymerized by the same systems. It is indeed surprising and unexpected that t-butyl crotonate can be homopolymerized utilizing these catalyst systems while ethyl crotonate cannot because the t-butyl group is larger than the ethyl group and should create a greater steric effect. Although not wishing to be bound by any particular theory, it may be that the t-butyl crotonate is able to polymerize by a different mechanism which is made possible by the fact that the large t-butyl group shields the active carbonyl in the ester and thus prevents it from entering into side reactions which inactivate the catalyst. The fact that t-butyl tiglate does not polymerize under the same condiions can possibly be explained by the fact that the monomer is too bulky to polymerize even by this theoretical mechanism.

It is therefore an object of the present invention to provide a novel process for the production of homopolymeric t-butyl crotonate.

It is a further object of the present invention to provide a novel process for the production of homopolymeric t-butyl crotonate which comprises contacting t-butyl crotonate with (1) a compound having the formula LiR wherein R is an amyl or sec. butyl radical, (2) an alkyl lithium-lithium hydride admixture wherein the alkyl group contains 4 to 5 carbon atoms, or (3) the compound produced by reacting lithium with a fused ring aromatic hydrocarbon.

It is a further object of the present invention to provide a homopolymer of crotonic acid.

These and other objects of the present invention will become more apparent to those skilled in the art upon reading the more detailed description set forth hereinbelow.

THE CATALYSTS

A. The first catalyst system which may be employed as the polymerization initiator in our novel process is a compound corresponding to the formula (I)         LiR wherein R is an amyl or sec. butyl radical. We have found that amyl lithium, in which the amyl group is in any possible form or structure, and sec. butyl lithium readily initiate the polymerization of t-butyl crotonate after relatively short periods of reaction.

Another unique feature of the present invention resides in the fact that the use of sec. butyl lithium results in the production of a partially crystallizable homopolymer of t-butyl crotonate.

The lithium compounds of Formula I may be produced by any known procedure and their preparation or the compounds per se form no part of the present invention except as catalysts for our novel process. Examples of catalysts which may be used include sec. butyl lithium, n-amyl lithium, sec.-amyl lithium, t-amyl lithium, isoamyl lithium, pri-act-amyl lithium, i.e. 1-lithium-2-methyl butane and the like.

Amounts ranging from about 0.01% by weight to about 2.0%, by weight, of the catalyst (A), based on the weight of the t-butyl crotonate, may be employed. Preferred amounts range from about 0.1% to about 1.0%, by weight, based on the weight of the t-butyl crotonate.

B. The second catalyst system which may be employed in our novel process is a system comprising an alkyl lithium compound wherein the alkyl group contains 4 to 5 carbon atoms, inclusive, to which has been added lithium hydride. We have found that the addition of the lithium hydride to the alkyl lithium results in the production of a catalyst system which effectively catalyzes the homopolymerization of the t-butyl crotonate while alkyl lithium compounds alone with the exception of catalysts (A), above, surprisingly do not function as catalysts for the t-butyl crotonate. Moreover, the results achieved by catalyst (B) wherein the alkyl lithium is one of the group of catalyst (A), are superior to those achieved using catalyst (A) alone.

The alkyl lithium compounds which may be employed in the process of the present invention as the first component of catalyst (B) include n-butyl lithium, sec.-butyl lithium, t-butyl lithium, isobutyl lithium, n-amyl lithium, sec.-amyl lithium, t-amyl lithium, isoamyl lithium, pri-act-amyl lithium, i.e. 1-lithium-2-methyl butane and the like. The alkyl lithium component of the catalyst system is utilized in amounts ranging from about 0.01% to about 2.0%, by weight, based on the weight of the monomer. Amounts ranging from about 0.01% to 0.5% are most effective and, as such, are generally preferred.

The second component of this catalyst system, i.e. lithium hydride, is merely added to the alkyl lithium before use by general mixing techniques, or other means which result in the production of a physical admixture, and is used in amounts ranging from about 0.01% to about 1.0%, by weight, preferably about 0.025% to about 0.1%, by weight, based on the weight of the t-butyl crotonate being polymerized. Thus, it can be seen that equivalent amounts of the alkyl lithium and lithium hydride may be used or an excess of the alkyl lithium is possible.

C. The third useful catalyst system in the polymerization of the t-butyl crotonate by our novel process is the product produced by recating lithium with a fused ring aromatic hydrocarbon. The catalyst system per se is known in the art, as is its preparation. A general means for preparing it, however, is shown in an article by Szwarc et al., J. Am. Chem. Soc., volume 78, page 2656, 1956. The process most widely used for the catalyst preparation comprises reacting the lithium and fused ring aromatic hydrocarbon in a polar solvent. The two additives combine to produce a so-called "charge transfer complex" which we have found to be active in regard to generating an electron and thereby initiating the polymerization of t-butyl crotonate. The concentration of the lithium in catalyst system (C) ranges from about 0.01% to about 2.0%, by weight, preferably 0.1% to 0.5% by weight, based on the weight of the t-butyl crotonate. That is to say, enough lithium is present in the system added to the reaction media, as the catalyst per se, so as to cause the concentration of the lithium to be within the above-specified ranges.

Examples of the fused ring aromatic hydrocarbons which may be used to form the third catalyst system useful in the novel process of the present invention include naphthalene, anthracene, phenanthracene, benzonaphthalene, fluorene, and the like.

THE REACTION CONDITIONS

The most critical limitation in regard to the novel process of the present invention is in regard to the amount of water which may be present in the reaction vessel during the polymerization. In this regard, the water content of each component added to the vessel, i.e. the catalyst, the monomer, the solvent, etc. must be reduced to a minimum. Since water drastically inhibits the polymerization, we generally prefer to render each additive substantially anhydrous. That is to say, the maximum amount of water which may be tolerated during the reaction should be no greater than about 10 parts per million, and each individual additive charged to the reaction vessel should be treated by any known means to reduce the water content thereof to an absolute minimum so the total amount of water present in the reaction vessel is below this figure.

Critical too, is the prevention of any oxygen containing gases, material, etc. and acids from being admitted to the reaction vessel, since contaminants of this sort also inhibit the t-butyl crotonate polymerization. The polymerization therefore, is carried out either under vacuum or in the presence of an inert gas which maintains a protective blanket or layer between the reaction media and the inactivating contaminants of acid, water, oxygen and the like which may be inadvertently present in the reaction vessel from the atmosphere etc. Gases which can be used for this purpose include nitrogen, argon, neon, normally gaseous hydrocarbons, i.e. ethane, propane, butane and the like.

The polymerization reaction is carried out, utilizing any of the three catalyst systems, at a temperature ranging from about −50° C. to about +50° C., preferably about −40° C. to room temperature, with atmospheric pressures preferably being used. Subatmospheric and superatmospheric pressures may be used if desired or necessary as a result of any particular procedure, variation or condition employed.

The time of contact of the t-butyl crotonate with any of the catalyst systems employed is not critical, but generally should be long enough so as to allow substantially complete polymerization of the t-butyl crotonate. Generally, contact times ranging from about 10 minutes to 12 hours are sufficient for this purpose.

Agitation during the polymerization of the t-butyl crotonate is not necessary, but it is usually desirable to maintain some degree of agitation in order to dissipate the heat of reaction and to maintain a maximum amount of contact between the non-polymerized monomer present and active catalyst at all times.

THE SOLVENTS

When utilizing the catalyst systems specified as groups A and B, above, it is not necessary to utilize a solvent during the polymerization. Solvents, however, may be used, if desired. When solvents are used, a non-polar solvent and generally, any material which is non-polar and is a solvent for the monomer and catalyst, can be used for this purpose. Such compounds as the aromatic hydrocarbons, e.g., benzene, toluene, xylene, the aliphatic hydrocarbons of 6 or more carbon atoms, e.g. cyclohexane, n-hexane, heptane, octane, and the like, are exemplary of useful materials.

When group C catalysts are employed, a solvent which is necessarily different from those disclosed above, must be employed. That is to say, the solvent must be polar in nature and have the capacity, or more precisely the ability, to enhance the formation of the catalytic, so-called charge transfer complex, which is produced from the fused ring aromatic compound and the lithium. Generlly, any compound which is an organic solvent for the t-butyl crotonate and the catalyst components and which contains an ether linkage can be used for this purpose, preferably in a concentration sufficient to enable the formation of the catalyst complex and also dissolve the t-butyl crotonate. Compounds which may be used as a solvent media for the group C catalyst system and its preparation include the dimethyl ether of ethylene glycol, the dimer of dimethyl ether of ethylene glycol, tetrahydrofuran, dioxane, the aliphatic ethers such as methyl ether, and the like.

THE t-BUTYL CROTONATE HOMOPOLYMER

The poly(t-butyl crotonate) is a white partially crystallizable-partially amorphous solid which does not soften or flow below 240° C. The polymer swells in acetone and dissolves in chloroform. The molecular weight of the polymer is generally very high as determined by estimation from the intrinsic viscosity of the polymer as produced. Evidence of these high molecular weights can be seen in the examples set forth hereinbelow wherein some of the intrinsic viscosities were as high as 3.1 dl./g. in chloroform at 30° C. The polymer decomposes to isobutylene and the corresponding acid at 250° C. Examination of the amorphous polymer indicates a glass transition temperature of 86° C. ±4° C. utilizing the torsional braid method to study the dynamic mechanical properties.

THE CROTONIC ACID POLYMER

The poly(crotonic acid) of our invention is prepared from the poly(t-butyl crotonate) disclosed above by hydrolyzing the t-butyl crotonate homopolymer. The method used to hydrolyze the polymer is not critical and forms no part of the present invention. Generally, any known standard hydrolyzation procedure may be used for this purpose as the reaction proceeds very rapidly and with a minimum of difficulty. One applicable method, among many which are obviously operable, is to reflux the homopolymer of t-butyl crotonate with chloroform containing sulfuric acid, under known reaction conditions. The poly(crotonic acid) is recovered by known procedures, such as filtration, etc. It is a white flaky solid which has a low solubility in water but dissolves in alkali metal hydroxides. Its salts, however, e.g. the sodium salt, produced by neutralization of the acid polymer with a basic sodium-containing compound, are generally water-soluble.

The homopolymers of the t-butyl crotonate and the crotonic acid are useful for such applications as water-soluble and water-insoluble coatings, films, casting and molding compositions and the like. Also, their properties lead them to use as resin additives in combination with polyesters, polyacrylates, other vinyl polymers and the like.

The following examples are set forth for purposes of illustration only and are not to be construed as limitations on the present invention except as set forth in the appended claims. All parts and percentages are by weight unless otherwise specified.

*Example 1*

Into a suitable reaction vessel are introduced 400 parts of toluene under vacuum. Three parts of a solution of 18% n-amyl lithium in hexane are then added and the mixture is cooled to −40° C. Thirty parts of t-butyl crotonate are then added. After 10 minutes the mixture begins to solidify and after 1 hour the polymerization is terminated by admitting air to the system. The reaction media is then treated with a 1:1 mixture of methanol and water to precipitate the polymer. The polymer is washed with the water-methanol mixture and dried under vacuum at 50° C. A yield of 30% of a solid white homopolymer of t-butyl crotonate is recovered.

*Example 2*

The procedure of Example 1 is again followed except that the catalyst solution contains an equivalent amount of secondary amyl lithium. A yield of 35% of a solid white homopolymer is recovered.

*Example 3*

Again utilizing the procedure of Example 1 except that pri-act-amyl lithium is employed as the catalyst, a yield of 39% of solid white homopolymer is recovered.

*Example 4*

The procedure of Example 1 is again followed except that 10 parts of t-butyl crotonate, 70 parts of toluene, and 0.074 part of sec. buty lithium are reacted at −40° C. for 1 hour. A yield of 57% of poly(t-butyl crotonate) having an intrinsic viscosity of 0.95 (in chloroform at 30° C.) and a glass transition temperature of 82° C. is recovered. The polymer is partially crystallizable when treated according to known crystallizing techniques, i.e. extraction of the amorphous portion of the polymer with chloroform.

*Example 5*

Two-hundred parts of toluene are introduced into a suitable reaction vessel and then 2 parts of a 15% solution of n-butyl lithium in hexane are added. The mixture is cooled to −40° C. and 50 parts of t-butyl crotonate and 0.1 part of lithium hydride are introduced. Polymerization occurs almost immediately and is allowed to continue for 1 hour. The reaction is then terminated by admitting air to the reaction system and the polymer is precipitated by adding a 1:1 mixture of methanol and water. The precipitated polymer is washed with the water-methanol mixture and dried under vacuum at 50° C. A yield of 60% of a solid white homopolymer is recovered, having a viscosity in chloroform at 30° C. of 3.10 dl./g.

*Example 6*

The procedure of Example 5 is followed except that in place of the n-butyl lithium an equivalent amount of isobutyl lithium is employed. A yield of 65% of a white, fluffy homopolymer is recovered.

*Example 7*

Again utilizing the procedure of Example 5, except that an equivalent amount of pri-act-amyl lithium is employed as the major catalyst component, 52% of a white, fluffy homopolymer is recovered.

*Example 8*

Into a suitable reaction vessel are charged 110 parts of the dimethyl ether of ethylene glycol and 0.3 part of lithium in the form of a charge complex with naphthalene. The mixture is cooled to −40° C. and 60 parts of t-butyl crotonate are added. Polymerization commences immediately and the contents of the vessel are solid in 6 minutes. After one hour the reaction is terminated by adding water to the system and the polymer is recovered as in Example 1. The yield is 70% of a solid white homopolymer having an intrinsic viscosity in chloroform at 30° C. of 0.2 dl./g.

*Example 9*

Utilizing the procedure of Example 8 but only one quarter as much catalyst and a temperature of −35° C., 47% of a solid white homopolymer having an intrinsic viscosity of 0.43 dl./g. in chloroform at 30° C. is recovered.

*Example 10*

Five parts of the polymeric material recovered in Example 1 are treated with 300 parts of chloroform and 6 parts of concentrated sulfuric acid. The mixture is heated with stirring for about one hour at 60° C. The liquid is decanted from the resultant gel-like material and the gel is recovered and washed with water in which it is insoluble. This material is shown to be poly(crotonic acid) by subsequent analysis of its sodium salt which is soluble in water as shown below.

Infrared analysis gives the expected infrared spectrum for the polymer. Elemental analysis shows C, H, O, observed 56.90; 7.42; 36.37; calculated 55.81; 7.03; 37.17.

The poly(crotonic acid) is converted to its sodium salt by heating it on a steam bath with 200 parts of a 15% aqueous sodium hydroxide for 20 hours. The hydrolysate is dialyzed against distilled water and freeze dried. Infrared spectrum analysis shows the resultant product to be the sodium salt of poly(crotonic acid). It is a white, fluffy solid that redissolves in water.

The following table is set forth in order to show the results obtained from various other catalysts within the scope of the present invention and to point out the inoperability of ethyl crotonate, t-butyl tiglate and various alkyl lithium catalysts of less than 5 carbon atoms, thereby accentuating the new and unexpected results achieved by our instant process.

TABLE I

| Ex. | Temp., °C. | Catalyst | Conc., percent | Solvent | Monomer, parts | Time, hrs. | Yield, percent |
|---|---|---|---|---|---|---|---|
| 11 | −35 | t-BuLi-LiH | + 0.06 | Toluene | t-Butyl crotonate, 100 | 1 | 50 |
| 12 | Room | Iso-BuLi-LiH | 0.03 | do | do | 18 | 65 |
| 13 | −40 | Sec-BuLi-LiH | 0.15 | do | do | 2 | 69 |
| 14 | −40 | Sec-amyl-LiH | 0.2 | do | do | 1 | 48 |
| 15 | −40 | n-BuLi | 0.05 | do | do | 48 | Trace |
| 16 | −35 | Li-Phenan | 0.3 | Glyme * | do | 1 | 57 |
| 17 | −40 | Li-Anth | 0.5 | do | do | 1 | 48 |
| 18 | Room | Li-Nap | 0.05 | do | do | 1 | 47 |
| 19 | −40 | Na-Nap | 0.5 | do | do | 1 | 0 |
| 20 | −40 | K-Nap | 0.3 | do | do | 1 | 0 |
| 21 | −40 | Li-Nap | 0.5 | do | Ethyl crotonate, 100 | 72 | 0 |
| 22 | −40 | Sec-BuLi | 0.5 | do | do | 72 | 0 |
| 23 | −40 | Li-Nap | 0.5 | do | t-Butyl tiglate, 100 | 72 | 0 |
| 24 | −40 | Sec-BuLi | 0.5 | do | do | 72 | 0 |

\* The dimethyl ether of ethylene glycol.
Nap.=Naphthalene Anth=Anthracene; Phenan=Phenanthracene.

We claim:
1. A process which comprises homopolymerizing t-butyl crotonate by contacting t-butyl crotonate with a catalyst system selected from the group consisting of (1) from about 0.01% to 2.0%, by weight, based on the weight of said t-butyl crotonate, of those having the formula

LiR wherein R is selected from the group consisting of amyl and sec.-butyl radicals, (2) from about 0.01% to 2.0%, by weight, based on the weight of said t-butyl crotonate, of an alkyl lithium in admixture with about 0.01% to about 1.0%, by weight, based on the weight of said t-butyl crotonate, of lithium hydride, said alkyl group having from 4 to 5 carbon atoms, inclusive, and (3) an organic ether solvent solution of the product produced by reacting lithium with a fused ring aromatic hydrocarbon in the presence of said solvent, said product having an active lithium concentration of from about .01% to 2.0%, by weight, based on the weight of said t-butyl crotonate, at a temperature ranging from about −50° C. to +50° C., in an inert atmosphere and under substantially anhydrous conditions.

2. A process which comprises homopolymerizing t-butyl crotonate by contacting t-butyl crotonate with a catalyst system comprising an organic ether solvent solution of the product produced by reacting lithium with a fused ring aromatic hydrocarbon in the presence of said solvent, at a temperature ranging from about −50° C. to +50° C., in an inert atmosphere and under substantially anhydrous conditions, said catalyst system having an active lithium concentration of from about 0.01% to 2.0%, by weight, based on the weight of said t-butyl crotonate.

3. A process which comprises homopolymerizing t-butyl crotonate by contacting t-butyl crotonate with a catalyst system comprising from about 0.01% to 2.0%, by weight, based on the weight of said t-butyl crotonate, of an alkyl lithium in admixture with from about 0.01% to about 1.0%, by weight, based on the weight of said t-butyl crotonate, of lithium hydride, said alkyl group having from 4 to 5 carbon atoms, inclusive, at a temperature of from about −50° C. to about +50° C. inclusive, in an inert atmosphere and under substantially anhydrous conditions.

4. A process which comprises homopolymerizing t-butyl crotonate by contacting t-butyl crotonate with from 0.01% to 2.0%, by weight, based on the weight of said t-butyl crotonate, of an amyl lithium, at a temperature ranging from about −50° C. to +50° C., in an inert atmosphere and under substantially anhydrous conditions.

5. A process which comprises homopolymerizing t-butyl crotonate by contacting t-butyl crotonate with from 0.01% to 2.0%, by weight, based on the weight of said t-butyl crotonate, of a sec.-butyl lithium, at a temperature ranging from about −50° C. to +50° C., in an inert atmosphere and under substantially anhydrous conditions.

6. A process which comprises homopolymerizing t-butyl crotonate by contacting t-butyl crotonate with a catalyst system comprising an organic ether solvent solution of the product produced by reacting lithium and naphthalene in the presence of said solvent, at a temperature of from about −50° C. to about +50° C. inclusive, in an inert atmosphere and under substantially anhydrous conditions, said catalyst system having an active lithium concentration of from about 0.01% to about 2.0%, by weight, based on the weight of said t-butyl crotonate.

7. A process according to claim 3 wherein the alkyl lithium is n-butyl lithium.

8. A process according to claim 3 wherein the alkyl lithium is amyl lithium.

9. A process according to claim 4 wherein the amyl lithium is pri-act-lithium.

References Cited by the Examiner

UNITED STATES PATENTS

| 2,071,419 | 3/1937 | Moss | 260—89.5 |
| 2,504,049 | 4/1950 | Richards | 260—89.5 |
| 2,846,427 | 8/1958 | Findlay | 260—94.9 |
| 3,088,939 | 5/1963 | Miller | 260—89.5 |

FOREIGN PATENTS

| 599,833 | 2/1961 | Belgium. |
| 1,097,681 | 9/1959 | Germany. |

OTHER REFERENCES

Gaylord et al.: Citation set forth in Paper No. 2, p. 248, 249 and 519 also relied on herein.
Hauser: J.A.C.S., vol. 75, pp. 1068–1072 (1953).
Szwarc: J.A.C.S., vol. 78, p. 2656 (1956).
Gaylord et al.: Linear and Stereoregular Addition Polymers, Interscience Publishers, Inc. New York, p. 247 (1959).

JOSEPH L. SCHOFER, *Primary Examiner.*

H. WONG, *Assistant Examiner.*